United States Patent [19]

Edahiro et al.

[11] 4,402,720
[45] Sep. 6, 1983

[54] PROCESS FOR PREPARING GLASS PREFORM FOR OPTICAL FIBER

[75] Inventors: Takao Edahiro, Mito; Shiro Kurosaki; Minoru Watanabe, both of Kanagawa, all of Japan

[73] Assignees: Nippon Telegraph & Telephone Public Corporation, Tokyo; Sumitomo Electric Industries Ltd., Osaka, both of Japan

[21] Appl. No.: 217,075

[22] Filed: Dec. 16, 1980

[30] Foreign Application Priority Data

Jan. 22, 1980 [JP] Japan .................................. 55-6633
Feb. 22, 1980 [JP] Japan ................................. 55-20624

[51] Int. Cl.³ ..................... C03B 19/06; C03B 37/075
[52] U.S. Cl. ...................................... 65/3.12; 65/18.2; 65/32; 350/96.34
[58] Field of Search ................ 65/18.2, 3.12, 32; 350/96.34

[56] References Cited

U.S. PATENT DOCUMENTS

| | | | |
|---|---|---|---|
| 3,883,336 | 5/1975 | Randall | 65/18.2 |
| 4,082,420 | 4/1978 | Shiraishi et al. | 65/3.12 X |
| 4,221,825 | 9/1980 | Guerder et al. | 65/3.12 X |
| 4,224,046 | 9/1980 | Izawa et al. | 65/3.12 |
| 4,227,907 | 10/1980 | Merritt | 65/3.12 X |

FOREIGN PATENT DOCUMENTS

1450123  9/1976  United Kingdom .

OTHER PUBLICATIONS

Gaind et al., "Physicochemical Properties of Chemical Vapor-Deposited . . . ", J. Electrochem Soc.: Solid State Science and Technology, Jan. 1978, pp. 139–145.
Gaind et al., "Oxynitride Deposition Kinetics . . . ", J. Electrochem Soc.: Solid State Science and Technology, Apr. 1977, pp. 599–606.

*Primary Examiner*—Richard V. Fisher
*Attorney, Agent, or Firm*—Sughrue, Mion, Zinn, Macpeak and Seas

[57] ABSTRACT

A process for producing a glass perform for optical transmission fibers, which includes supplying a gaseous silicon compound, ammonia or a gaseous nitrogen compound, and an oxygen-containing gas as starting gases into a high temperature zone to produce fine particles of $SiO_xN_y$ glass and depositing the fine particles in the form of a soot or a transparent glass on a starting member to produce nitrogen-doped silica glass.

15 Claims, 9 Drawing Figures

PROCESS FOR PREPARING GLASS PREFORM FOR OPTICAL FIBER

BACKGROUND OF THE INVENTION

This invention relates to a process for preparing a glass preform for production of an optical fiber. More particularly, this invention relates to an $SiO_2$ glass preform doped with nitrogen.

Generally, a glass preform for optical transmission is required to have a predetermined distribution of refractive index in the radial direction of the glass rod, uniformity in the concentration and composition of ingredients, low content of OH radicals and impurities comprising transition metals such as iron and copper, and high light transmittance. As described in Japanese Patent Application (OPI) Nos. 6428/71, 5788/71, 10055/74 and 10056/74 (the term "OPI" as used herein refers to a "published unexamined Japanese patent application"), such preform is conventionally produced by MCVD process, OVPO process or VAD process from silica-based glass doped with a metal oxide to provide high refractive index. However, the silica-based glass doped with metal oxide has high light transmittance but the dopant used is expensive. As taught in Japanese Patent Application (OPI) Nos. 76538/74 (equivalent to U.S. Pat. No. 4,082,420) and 87339/75 (equivalent to British Pat. No. 1,450,123 published Sept. 22, 1976), it is well known that oxide dopants can be replaced with fluorine or nitrogen to either decrease or increase the refractive index of glass, but this conventional method is not capable of producing stably silica-based glass containing a predetermined amount of nitrogen dopant. One of the articles that report the change in the refractive index of $SiO_xN_y$ glass according to the amount of dopant nitrogen is A. K. Gaind and E. W. Hearn, "Physicochemical Properties of Chemical Vapor-Deposited Silicon Oxynitride from an $SiH_4$—$CO_2$—$NH_3$—$H_2$ System" in J. Electrochem. Soc.: Solid-State Science and Technology, January 1978, pp. 139-145. One method for producing such $SiO_xN_Y$ glass is the chemical vapor deposition (CVD) process described in A. K. Gaind, G. K. Ackermann, V. J. Lucarini and R. L. Bratter, "Oxynitride Deposition Kinetics in an $SiH_4$—$CO_2$—$NH_3$—$H_2$ System" in J. Electrochem. Soc.: Solid-State Science and Technology, April, 1977, pp. 599-606. However, the primary purpose of this method is to deposit a stable film of $SiO_xN_y$ on a silicon wafer, and the method aims at providing an $SiO_xN_y$ film of good characteristics rather than forming it quickly. For this reason, the rate at which the film is formed in a given period of time according to this method is low. That is, the method produces a non-defective film with low concentrations of materials being supplied into a heterogeneous reaction system at relatively low temperature. Contrary, in the production of a glass fiber for optical transmission, since the role of glass per se predominates over other components and also the glass is used in a large quantity, the rate of formation of a glass fiber must be at least a hundred times faster than that of the film of $SiO_xN_y$ formed on the silicon wafer. The content of

radicals in a glass fiber for optical transmission should be minimized because their presence is the cause of absorption loss, particularly transmission loss in the range of long wavelengths, due to their vibration. However, in the conventional film making technique that uses $NH_3$ as one material, the formation of residual —SiOH radicals is unavoidable because of the presence of hydrogen.

On the other hand, Japanese Patent Application (OPI) No. 134134/79 discloses that a porous glass can be doped with nitrogen by subjecting the porous glass to heat treatment in ammonia, but such process is not satisfactory since the amount of nitrogen doped is extremely low.

SUMMARY OF THE INVENTION

One object of this invention is to provide a process for producing a glass preform adapted for the making of a glass fiber for optical transmission having low transmission loss, a requisite distribution such as a parabolic distribution of refractive index in a radical direction to reduce optical signal distortion and having increased practical strength. Such glass preform is produced by making silica doped with a dopant comprising nitrogen alone or in combination with other dopants in the form of an oxide or by additionally making undoped silica or silica doped with fluorine.

A further object of this invention is to make fine particles of $SiO_xN_y$ glass by supplying glass-forming gases in such a manner that an Si—N bond of low chemical bond strength is formed.

Another object of this invention is to produce N-doped $SiO_xN_y$ glass at a rate at least a hundred times faster than in the conventional CVD process. This object is achieved by performing a homogeneous reaction with high concentration of a silicon compound and at high reaction temperatures and either forming directly a transparent glass coating from the resulting powder of $SiO_xN_y$ or sintering the resulting powder of $SiO_xN_y$ to form a transparent glass product.

DETAILED DESCRIPTION OF THE INVENTION

Figure 1:
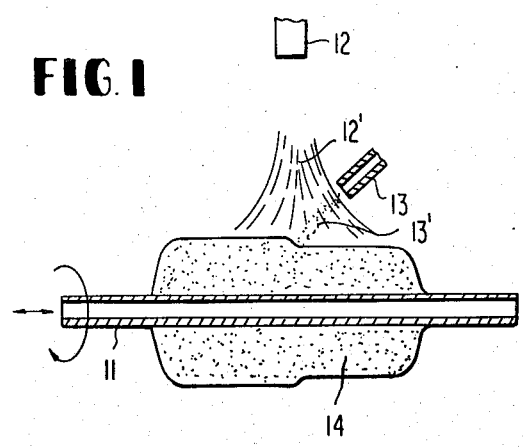
FIGS. 1 and 2 show two embodiments of the production of a glass preform for optical transmission according to the present invention by the outside vapor-phase deposition process wherein individual gases are supplied into a plasma flame.

The present invention provides a process for producing SiOxNy glass with or without using ammonia and includes roughly the following two alternative procedures.

[1] A process comprising forming SiOxNy glass using a nitrogen halide.

In this embodiment, a gaseous silicon compound such as SiH₄, SiHCl₃ or SiCl₄ gas that reacts with oxygen gas to form SiO₂ and a nitrogen halide such as NCl₃, NOCl, NO₂Cl, ClN₃, N₂F₂ or NF₃ that generates nascent nitrogen are used as materials for forming glass of high refractive index, and NOx (e.g., NO, NO₂, N₂O, N₂O₅, etc.), CO₂ or O₂ that exhibits oxidizing effect at high temperatures is used as an oxidizing gas. By using these gases, SiOxNy glass substantially free from residual

radicals is produced.

[2] A process comprising forming and depositing SiOxNy as a transparent glass using ammonia.

In this embodiment, a gaseous silicon compound, ammonia, and oxygen and/or a gaseous oxygen compound are supplied into a fire flame where the three gases react with each other to form fine particles (or soot) of SiOxNy glass, and a layer of the glass soot formed is directly deposited on a starting member in a molten state to thereby form nitrogen-doped silica glass.

In the both cases of [1] and [2] if desired, a clad comprising fine particles of fluorine-doped silica glass or pure silica glass can be formed in a molten state on the outer surface of the core comprising nitrogen-doped silica glass. And further the glass such as SiO₂, TiO₂—SiO₂, Al₂O₃—SiO₂ and so on may be coated on the above preform. In the case [1], the source of heating used in this invention is an energy source free from hydrogen, such as CO₂ laser, anhydrous plasma flame or a fire flame obtained by oxidizing (CN)₂, CS₂ or CCl₄. Alternatively, the presence of hydrogen can be avoided by applying heat indirectly to the reaction mixture through the wall of silica tube. In either method, a gas mixture substantially free from

can be obtained.

Table 1 below illustrates various gases used to supply nitrogen. The table also shows the characteristics of these gases.

TABLE 1

| Compound | m.p. (°C.) | b.p. (°C.) | State of Ordinary Temp. | Remarks |
| --- | --- | --- | --- | --- |
| N₂F₂ | −100 | | colorless gas | with odor |
| NF₂ | | −125 | | not available as pure form |
| NF₃ | −216.6 | −120 | colorless gas | stable and not explosive |
| NCl₃ | <−27 | ≦71 | yellow oily liquid | explosive |
| ClN₃ | −100 | −15 | colorless gas | little dangerous if mixed with N₂ |
| NOCl | −64.5 | −5.5 | yellowish red gas | highly reactive |
| NO₂Cl | −31 | 5 | yellowish to reddish brown gas | |

According to this invention, the values of x and y of SiOxNy are controlled by varying the amounts of nitrogen and oxygen dopants through the change in the proportion of Si-supply gas (SiCl₄), N-supply gas (NCl₃, NOCl, NO₂Cl, ClN₃, N₂F₂, NF₃, etc.), and O-supply gas (O₂, CO₂, NO₂, etc.), especially the ratio of N-supply gas to O-supply gas.

In the present invention [1] or [2], the mixing and reaction of these gases can be effected by a fire flame or by making use of a partition wall composed of silica glass if such mixing and reaction should be performed only within the reaction system. Alternatively, the same object can be achieved by supplying these gases in a diluted form. It is to be understood that some gases do not need such partition wall or a sheathed nozzle.

In the present invention [1] or [2], SiCl₄ that reacts with oxygen gas to form SiO₂ or SiF₄/SiCl₄, SiCl₄/COF₂, CF₄, SF₆ or CCl₂F₂ that reacts with oxygen to form F-doped SiO₂ glass is used as a material for making glass of low refractive index, and NO₂, CO₂ or O₂ that exhibits oxidizing effect at high temperatures is used as an oxidizing gas. By using these gases, SiO₂ glass or F-doped SiO₂ glass substantially free from residual

radicals is produced. If necessary, N₂F₂ or NF₃ may be used as a gas for generating nascent fluorine.

In accordance with the process of this invention [1] or [2], a fiber having a clean and smooth surface free from origins of Griffice crack can be obtained by melt-spinning a preform coated with SiO₂ doped with Al₂O₃, TiO₂ or ZrO₂ that has a lower melting point and thermal expansion coefficient than pure SiO₂. The fiber also has great strength because it has residual compressive strain in the surface.

The conventional method for producing a glass preform for the making of an optical fiber is described hereunder. A mixture of a gaseous silicon compound such as $SiH_4$, $SiHCl_3$, $SiCl_4$ or $SiF_4$ (hydrogenated silicon compounds, organic silicon compounds and silicon halides), an oxygen-containing gas such as $CO_2$, $NO_x$ or $O_2$, and a gas such as $NH_3$ that generates nascent nitrogen gives $SiO_xN_y$ under heating at elevated temperatures following the reaction course indicated below:

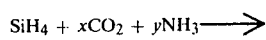 (1)

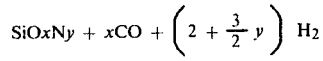

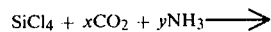 (2)

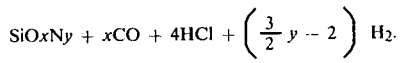

As described above, these $SiO_xN_y$ compounds ($SiO_2$ to

)

are generally used to make a protective film in a semiconductor by applying a radio frequency plasma in vacuum (at lower temperature) or by the CVD process. According to one example of the reaction (1) for the CVD process achieving faster film formation, dilute materials are used (i.e., $H_2$: ~110 l/min., $NH_3+CO_2$: ~2.3 l/min., $SiH_4$ (5% in $H_2$): ~10 cm³/min., ~200 cm³/min., 900°-1,000° C.) and the reaction temperature is as low as 800° to 1,200° C. In one example of the reaction (2), the production of $Si_3N_4$ is performed using $SiCl_4$ and $NH_3$ at a temperature between 1,000° and 1,500° C. According to such conventional method, it is not easy to make a sufficient amount of glass to meet the requirements for the production of a glass preform. According to this invention, the end products of the reactions (1) and (2) are formed in great quantities by supplying increased amounts of a gaseous silicon compound and other materials at higher temperatures.

Now, referring to the accompanying drawings, 11, 21, 41 and 51 are starting members; 12 is a high frequency plasma torch; 12′ is a hot gas; 13 and 23 are nozzles; 13′ and 23′ are fine particles of glass; 14 and 24 are $SiO_xN_y$ glass; 22 is a hot furnace; 31, 32 and 33 are gas outlets of nozzles; 34 and 35 are gas outlets of nozzles for gas curtain; 61 and 71 are silica glass tubes as starting members; 42 and 72′ are plasma flame; 52 is fire flame; 62 is oxygen-hydrogen flame; 43, 53, 65, 66, 67, 75, 76 and 77 are starting gas supplying pipes; 44, 55, 63 and 73 are fine particles of $SiO_xN_y$ glass; 45, 56, 64 and 74 are deposited glass; and 81 is a silica tube; 82 is a high frequency plasma torch; 83 is a nozzle; 84 is a nitrogen-doped silica glass.

The present invention is further described in greater detail with reference to the accompanying Figures, but the invention is not limited to the embodiments shown in Figures.

[1] Process for producing a transparent glass by forming fine particles of $SiO_xN_y$ glass using a nitrogen halide as a starting gas and depositing in a vitreous state or in a powdery state and then sintering the particles in the latter case:

FIG. 1 illustrates one embodiment of the production of a glass preform for optical transmission according to this invention. A thin-walled silica tube 11 (which may be reinforced with a graphite rod inserted in it) as a starting member is rotated or reciprocated as shown, and a hot plasma flame 12′ of inert gas such as Ar or $N_2$ produced by a high-frequency plasma torch 12 is blown against the tube 11. As that hot inert gas is being blown, three gases, i.e., a gaseous silicon compound such as $SiCl_4$, a nitrogen halide and an oxygen-containing gas, are supplied through a nozzle 13 to be described hereunder, and the mixture of the three gases is heated with said hot inert gas 12 to produce powdery $SiO_xN_y$ 13′. In FIG. 1, a coating of vitreous $SiO_xN_y$ glass 14 is formed on the starting member.

Figure 2:
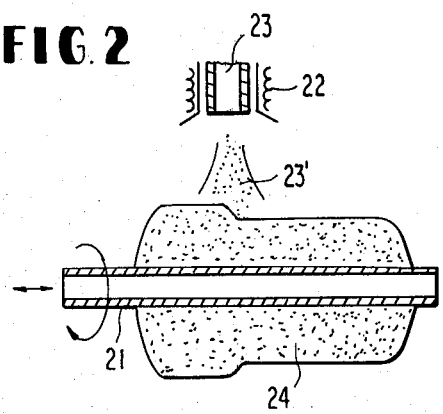

FIG. 2 shows another embodiment of the production of a glass preform for optical transmission according to this invention. A starting member 21 is rotated or reciprocated while glass-forming gases supplied from a nozzle 23 are heated in a hot furnace 22 such as an electric furnace (using a platinum wire). As described hereunder, the construction of the nozzle 23 is such that an inert gas such as helium or nitrogen is supplied from an outer coaxial pipe to provide a separation between air and the gases supplied from inner pipes. As a result of the high-temperature reaction, a coating of $SiO_xN_y$ 23′ is formed on the starting member as a vitreous glass product 24.

Figure 3A:
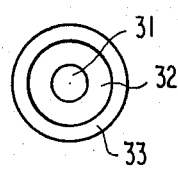
FIGS. 3(a) and 3(b) are each a cross section of a nozzle used to supply the gases in the embodiment of FIGS. 1 and 2 in the production of a glass preform for optical transmission according to the present invention.

FIG. 3(a) is a cross section of the tip of a nozzle to be used in one embodiment of the production of a glass preform for optical transmission according to this invention. In a reaction of the type used in this invention where high concentrations of gases are supplied at high temperatures, for example, in a reaction under such conditions that $SiCl_4$ and a mixture of $ClN_3$ and $CO_2$ (each diluted with an inert gas) are supplied at rates of less than 100 cm³/min and less than 1,000 cm³/min, respectively, at 1,150° to 1,800° C., the individual gases must be separated from each other before they enter the reaction system, particularly because the nitrogen halide gas is high explosive. The nozzle shown in FIG. 3(a) comprises coaxial pipes 31, 32 and 33 through which separate gases are supplied. Examples of the combinations of gases to be supplied through three pipes include the combination of a mixture of nitrogen halide and an inert gas (to be supplied through pipe 31), a mixture of a gaseous silicon compound $SiCl_4$ and an inert gas (supplied through pipe 32), and an oxygen-containing gas (through pipe 33), as well as the combination of a mixture of a gaseous silicon compound $SiCl_4$ and an inert gas (through pipe 31), a mixture of nitrogen halide and an inert gas (through pipe 32) and an oxygen-containing gas (through pipe 33). Another possible combination comprises a mixture of nitrogen halide, a gaseous silicon compound and an inert gas (supplied through pipe 31) and an oxygen-containing gas (supplied through pipe 33). In the last mentioned combination, the pipe 32 is omitted from the nozzle. It is to be emphasized here again that the oxygen-containing gas should be supplied from an outer pipe to make an Si—N bond to some extent before the formation of an Si—O bond. If the circumstances permit the use of a nozzle of complex construction, the gases mentioned above (those supplied from the central pipe mentioned first, next come those supplied from the intermediate pipe, and those supplied from the outer pipe mentioned last) may be supplied in portions rather than at a time. In this case, an oxygen-containing gas may be supplied through the central pipe.

Figure 3B:
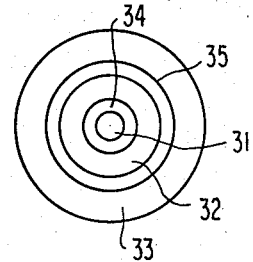

FIG. 3(b) is a cross section of the tip of a nozzle to be used in another embodiment of the production of a glass preform for optical transmission according to this invention. Gases having different properties may mix and react with each other right at the discharge end of the nozzle and form fine particles of glass that deposit on the tip of the nozzle to reduce the gas flow. The mixing of individual gases right at the discharge end of the nozzle can be effectively prevented with a pipe for gas curtain 34 which is provided, as shown in FIG. 3(b), between the pipes 31 and 32 of FIG. 3(a) as well as a pipe 35 provided for the same purpose between the pipes 32 and 33. Examples of effective curtain gas are those of high thermal conductivity such as helium that provides a uniform temperature distribution for the gases to be mixed subsequently in the reaction system. To change the refractive index through the change in the amount of nitrogen dopant (the more nitrogen dopant used, the higher the refractive index of $SiO_xN_y$), a gaseous silicon compound is supplied at a rate that is determined by a desired rate of glass formation while the ratio of a mixture of nitrogen halide and oxygen-containing gas to the gaseous silicon compound is held constant and the ratio of nitrogen halide to oxygen-containing gas is caused to vary. Such technique is advantageous in that it achieves non-fluctuating doping of $SiO_xN_y$.

Figure 4:
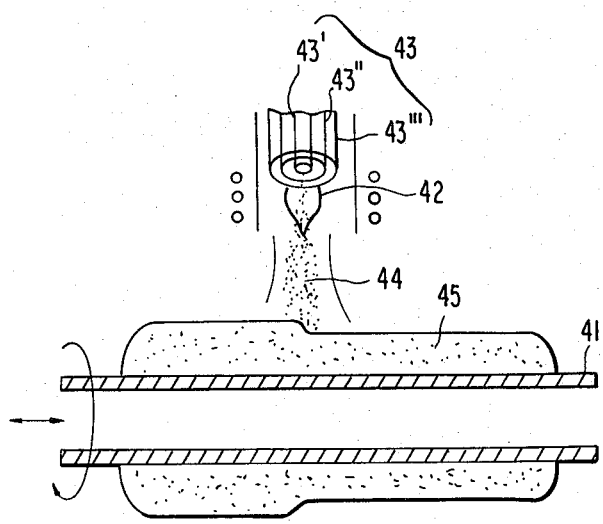
FIG. 4 is another schematic representation of the production of $SiO_xN_y$ glass by the outside vapor-phase deposition process wherein individual gases are supplied into a plasma flame.

FIG. 4 illustrates another embodiment of the production of a glass preform for optical transmission according to this invention. A thin-walled silica tube 41 (which may be reinforced with a graphite rod inserted in it) as a starting member is rotated and reciprocated as shown, and a hot plasma flame of inert gas such as Ar, $N_2$ or He produced by a high-frequency plasma torch 42 is supplied with a gaseous silicon compound $SiCl_4$, an N-supply gas and an oxygen-containing gas. The gases are supplied from a nozzle 43. In this figure, 43' is a pipe through which $SiCl_4$ flows, 43" is a pipe through which an N-supply gas flows, and 43''' is a pipe through which an oxygen containing gas flows. The resulting gas mixture is heated with the hot gas to produce fine particles of $SiO_xN_y$ glass 44 which is melted to form a film of glass 45 on the starting member.

Figure 5:
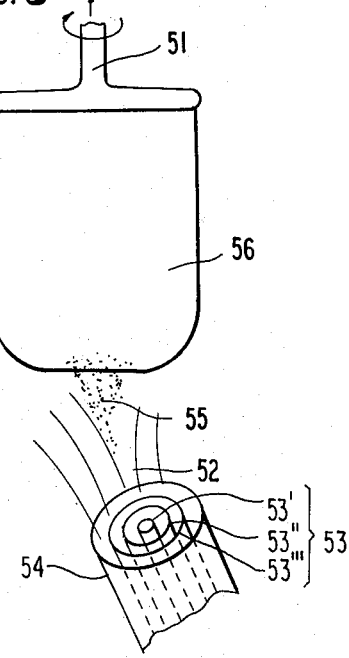
FIG. 5 is a schematic representation of the production of SiOxNy glass by the vapor-phase axial deposition process wherein individual gases are supplied into an anhydrous flame such as CS₂—O₂ flame.

FIG. 5 illustrates still another embodiment of the production of a glass preform for optical transmission according to this invention. A starting member 51 is rotated and reciprocated while glass-making gases supplied from a nozzle 53 are heated with a fire flame 52 obtained by burning $(CN)_2$, $CS_2$ or $CCl_4$. In this figure, 53' is a pipe through which $SiCl_4$ flows, 53" is a pipe through which an N-supply gas flows, 53''' is a pipe through which an oxygen-containing gas flows, and 54 is a pipe through which a burning gas or a mixture of a burning gas and oxygen gas flows. Here again all gases must be placed in an atmosphere free from any hydrogen compound such as $H_2O$. It is to be understood that either pipe 53''' or 54 may be omitted since the gas flowing through one pipe can serve the purpose of the gas flowing through the other.

The fine powder of $SiO_xN_y$ glass 55 formed by the high-temperature reaction is deposited as a powdery glass layer 56 on the starting member. Alternatively, the gases supplied from the nozzle are heated in a hot furnace such as an electric furnace (using a platinum wire). As described above, the construction of the nozzle is such that an inert gas such as He gas or nitrogen gas is supplied from an outer coaxial pipe to provide a separation between air and the gases supplied from inner pipes. By the way the above description of FIGS. 1 and 4 is based on the formation of a coating of transparent glass on a starting member, but it should be understood that a coating of fine particles of $SiO_xN_y$ glass is first formed on the starting member before it is sintered to provide transparent glass.

The resulting powder of $SiO_xN_y$ of this invention is then sintered at about 1,450° C. which is close to the temperature for sintering undoped $SiO_2$ glass. This sintering operation differs from the sintering of $B_2O_3$-, $P_2O_5$- or $GeO_2$-doped glass produced by the conventional MCVD method, OVPO or VAD method in that it must be performed in an oxygen-free inert gas atmosphere or in vacuum or in a gas atmosphere containing chlorine or nitrogen instead of oxygen. This is because the presence of oxygen at a temperature close to the sintering temperature results in oxidation of nitride. Individual fine particles of $SiO_xN_y$ glass are preferably surrounded by a composition doped with only a small amount of nitrogen and hence close to that of $SiO_2$, because this results in the production of a sintered product completely free from air bubbles. To provide such a desired product, fine particles of $SiO_xN_y$ are gradually heated to a temperature lower than the sintering point either in vacuum or an oxygen-free inert gas or chlorine gas, and thereafter, the particles are held in a dry oxygen gas to bring the composition of the superficial part of the particles close to that of $SiO_2$, followed by sintering in the atmosphere defined above. An effective method for this sintering is the conventional "zone sintering" technique. In this manner, a sintered, transparent glass preform is obtained wherein the content of nitrogen dopant increases to provide a higher refractive index as the radial distance from the center increases.

As in the conventional OVPO process or VAD process, a coating of $SiO_2$ with or without a fluorine dopant is deposited in a molten state on the outer surface of the preform. Alternatively, said coating is first deposited as finely divided glass, which is then sintered into transparent glass. To achieve this purpose in the OVPO process as shown in FIG. 1 or 4, the reaction may be performed at a suitable temperature with the valve on the N-supply line of this invention being closed or with a fluorine-containing gas being supplied into the N-supply line or the gaseous silicon compound-supply line. In the VAD process, gases to form an outer glass component, for example, a mixture of $SiCl_4$ and $O_2$, may be blown from an external burner to form a coating of fine particles on the preform in a vitreous state or in a powdery state.

it is to be noted that the sintered preform obtained by the method illustrated in FIG. 1 or 4 is then freed of the starting member 11 and 41, and its inside surface is made smooth and clean by reaming, laser treatment, flame treatment, washing in hydrofluoric acid or any other conventional technique to provide a cylindrical glass product, which is optionally set up on a glass lathe and heated to collapse the hollow part of the cylinder and then drawn to make a preform rod of a requisite diameter.

Figure 6:
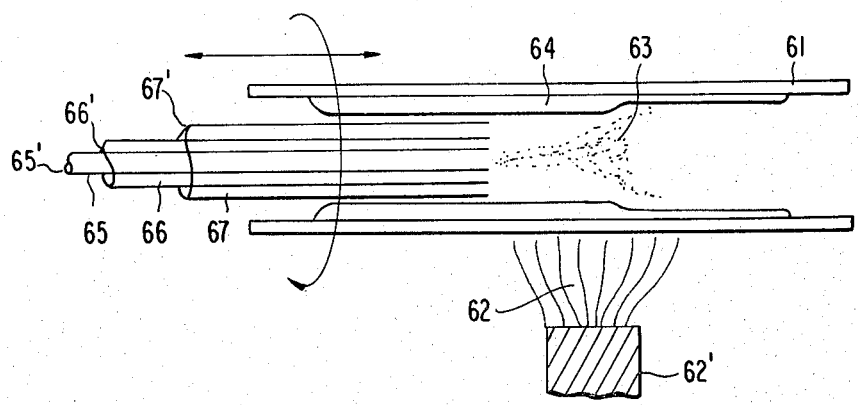
FIG. 6 is a schematic representation of the formation of SiOxNy (anhydrous) glass by the modified chemical vapor deposition process.

The MCVD process as another embodiment of this invention is hereunder described by reference to FIG. 6. The outside surface of a silica glass tube 61 that is rotating and translating in axial direction is heated with an oxygen-hydrogen flame or natural gas-oxygen flame 62 (from a burner 62'). A gaseous silicon compound SiCl$_4$, nitrogen halide, e.g., NCl$_3$, as an N-supply gas, and O$_2$ as an O-supply gas are supplied into the tube to form fine particles of SiO$x$N$y$ 63 which are deposited on the inner wall of the tube where they are melted to make a coating of transparent glass 64. Preferably, these gases are introduced into the reaction system separately using a sheathed nozzle such that SiCl$_4$ 65' is supplied through a pipe 65, NCl$_3$ 66' through a pipe 66 and O$_2$ 67' through a pipe 67. Depending on the type of gases used, such sheathed nozzle may be omitted. Here again the amount of nitrogen dopant can be controlled by varying the ratio of nitrogen halide to oxygen gas supplied. Before forming the coating of SiO$x$N$y$ core glass, a cladding layer comprising, for example, B$_2$O$_3$—SiO$_2$, B$_2$O$_3$—SiO$_5$—SiO$_2$, B$_2$O$_3$—F—SiO$_2$, P$_2$O$_5$—F—SiO$_2$ or SiO$_2$ glass, is formed in the same manner as the conventional MCVD process. The silica glass tube having both the cladding and core glass films deposited on the inner wall is then set up on a glass lathe and heated (up to 1,800° C.) to collapse the hollow part of the tube and drawn to make a transparent rod-shaped glass preform of a requisite diameter.

Figure 7:
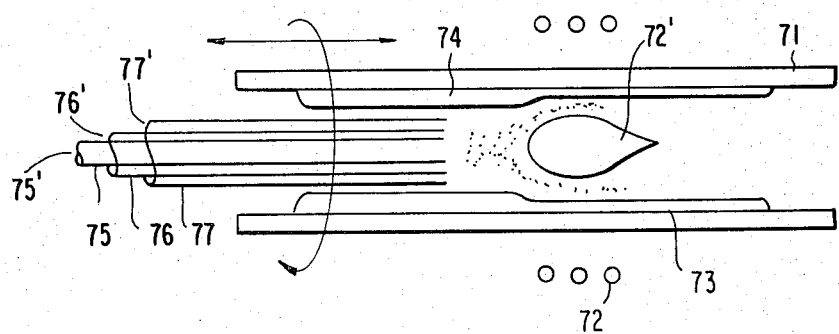
FIG. 7 is a schematic representation of the formation of SiOxNy (anhydrous) glass by the plasma chemical vapor deposition process.

The PCVD process as another embodiment of this invention is now described by reference to FIG. 7. The PCVD process is performed either under vacuum (using cold plasma) or under atmospheric pressure (using hot plasma), and the following description concerns the use of hot plasma, but it should be understood that this invention also permits the use of cold plasma. A silica glass tube 71 is inserted into a high-frequency coil 72 and rotated and translated along the longitudinal axis as it is heated with a plasma flame 72' formed within the tube. A gaseous silicon compound SiCl$_4$, N-supply gas such as NCl$_3$, and O-supply gas such as CO$_2$ are supplied into the tube to from fine particles of SiO$x$N$y$ glass 73 which are deposited on the inner wall of the tube where they are melted to make a coating of transparent glass 74. Preferably, these gases are combined at a point near the plasma flame after they were introduced into the tube separately such that SiCl$_4$ 75' is supplied through a pipe 75, NCl$_3$ 76' through a pipe 76 and CO$_2$ 77' through a pipe 77. Depending on the type of gases used, such care may not be necessary. Here again the amount of nitrogen dopant can be controlled by varying the ratio of NCl$_3$ to CO$_2$ supplied. Before forming the coating of SiO$x$N$y$ core glass, a cladding comprising the materials described above is formed in the conventional manner. The silica glass tube having both the cladding and core glass films deposited on the inner wall is then set up on a glass lathe and heated to collapse the hollow part of the tube and then drawn to make a transparent rod-shaped glass preform of requisite diameter. The resulting preform cylinder or rod is subjected to a surface treatment to provide a smooth and clean outer surface, and is supplied into a high-frequency induction heating furnace, electrical furnace or flame furnace where it is melt-spun into a fiber. Before contacting a reel or capstan or other supporting members, the fiber is prime-coated with a baked coating of thermosetting resin, metal coating or inorganic coating to thereby provide a strong fiber for optical communication which is yet to be jacketed with a secondary coating.

Figure 8:
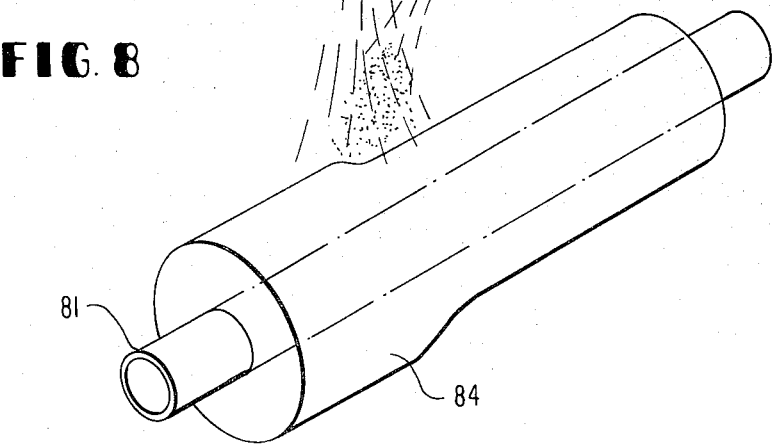
FIG. 8 illustrates the principle of operation for producing a glass preform for optical transmission by one embodiment of the present invention utilizing the outside vapor-phase deposition process.

[2] Process for forming directly a molten SiO$x$N$y$ glass using NH$_3$ as a starting gas:

One embodiment of this process wherein a glass preform adapted for optical transmission is produced by the OVPO method is described hereunder by reference to the accompanying drawing in FIG. 8 that schematically represents the operating principle of that method. A thin-walled silica tube 81 as a starting member is rotated and reciprocated along the longitudinal axis of the tube under a high-frequency plasma torch 82 that generates a hot plasma flame of inert gas such as helium, nitrogen or argon which is blown against the outside wall of the tube 81. If necessary, the tube may be reinforced by inserting a graphite rod in it. A nozzle 83 pointing to the tube 81 supplies jets of a gaseous silicon compound such as monosilane, trichlorosilane, silicon tetrachloride or silicon tetrafluoride, ammonia and oxygen and/or gaseous oxygen compound such as carbon dioxide or nitrogen oxide, and a mixture of these gases is heated in the plasma flame to produce the soot of SiO$x$N$y$ glass which is directly deposited as a molten layer on the outside surface of the tube 81. Therefore, transparent nitrogen-doped silica glass (SiO$x$N$y$) 84 builds up on the outer wall of the tube 81. In this case, an inert gas such as helium or nitrogen is preferably supplied from the outer periphery of the nozzle 83 so that it encloses the gases mentioned above to provide a separation from ambient air. To change the index of refraction of nitrogen-doped silica glass 84 through the change in the amount of nitrogen dopant, the gaseous silicon compound is supplied at a rate that is determined by a desired rate of glass formation, while the ratio of the supply (per given period) of a mixture of ammonia and oxygen and/or gaseous oxygen compound to that of the gaseous silicon compound is held constant, and the ratio of the supply (per given period) of ammonia to that of oxygen and/or gaseous oxygen compound is caused to vary. Such technique is advantageous in that it achieves uniform doping of nitrogen. In the present embodiment, all gases supplied are heated with a plasma flame of inert gas, but instead, the gases flowing through the nozzle 83 may be directly heated with an electric furnace (using a platinum wire) disposed around the nozzle. Instead of rotating and reciprocating the silica tube 81 along its longitudinal axis, the nozzle 83 may be revolved around a fixed silica tube 81 and be reciprocated along its longitudinal axis.

In a reaction of the type used in this invention where high concentrations of gases are supplied at high temperatures, for example in a reaction under such conditions that monosilane and a mixture of ammonia and carbon dioxide are supplied at rates of 0.1 l/min and less than 10 l/min, respectively, at 1,000 between 1,500° C., or that silicon tetrachloride and a mixture of ammonia and carbon dioxide are supplied at rates of less than 0.1 l/min and less than 10 l/min, respectively, at 1,100 between 1,700° C., the individual gases are preferably separate from each other when they are jetted from the nozzle 83. It is important that the bonding of silicon and nitrogen is promoted to some extent before a silicon-oxygen bond is formed, and this is achieved by supplying oxygen and/or gaseous oxygen compound from the outer periphery of the nozzle 83. For this purose, a nozzle 83 comprising two coaxial pipes is employed, and a mixture of gaseous silicon compound and ammonia which is optionally combined with hydrogen and/or insert gas is supplied through the inner pipe, and oxygen and/or gaseous oxygen compound is supplied through the outer pipe. Alternatively, the nozzle comprises three coaxial pipes, and oxygen and/or gaseous oxygen compound is supplied through an outer pipe, and the gaseous silicon compound and ammonia are separately supplied through the two inner pipes. If necessary, the gaseous silicon compound and ammonia may be mixed with hydrogen and/or an inert gas. In addition, to prevent these gases from reacting with each other and the reaction product from depositing at the tip of the nozzle 83 to reduce the gas flow, one more coaxial pipe may be added to the former type of nozzle so that a gas of high thermal conductivity such as an inert gas represented by helium or hydrogen is supplied between the passage for the mixture of gaseous silicon compound and ammonia and that for oxygen and/or gaseous oxygen compound. In the case of the latter type of nozzle, two more coaxial pipes may be added so that the shielding gas defined above can flow between the passage for the gaseous silicon compound and that for ammonia as well as between the passage for ammonia and that for oxygen and/or gaseous oxygen compound. The advantage of using helium or hydrogen having high thermal conductivity is that it provides a uniform temperature distribution for the gases when they are mixed in the reaction system, thereby achieving the intended even reaction.

The resulting nitrogen-doped silica glass 84 is then freed of the silica tube 81, and its inside as well as outside surfaces are made smooth and clean by a known technique until a perfect cylinder is obtained. It is then set up on a glass lathe and heated to collapse the hollow part of the tube and then drawn to make a preform rod of a requisite diameter.

A coating of silica glass with or without fluorine dopant may be directly deposited in a molten state on the nitrogen-doped silica glass 84 formed on the outside surface of the tube 81. This is achieved simply by replacing ammonia with a gaseous fluorine compound which is supplied at a given rate and by letting it react with the silica glass 84 at a suitable temperature. The resulting preform is freed of the silica tube 81 and has its inside as well as outside surfaces made smooth and clean to provide a perfect cylinder which is then heated to collapse the hollow part of the tube and drawn to make a optical fiber preform of a requisite diameter. A coating of silica glass doped with titanium dioxide, aluminum oxide, or zirconium oxide is applied by the OVPO process after a coating of $SiO_2$ or F doped $SiO_2$ is made as mentioned above to give an optical fiber preform.

The preform thus-obtained is then subjected to a suitable surface treatment, spun into a fiber and covered with a primary coating to provide a strong fiber for optical transmission which is yet to be jacketed with a secondary coating. The description of the present embodiment is based on the OVPO process, but it should be understood that this invention also permits the use of the MCVD process and VAD process.

The present invention is further illustrated by the following Examples, but they are given for illustrative purpose only and are not to be construed as limiting the present invention.

Example 1

A silica glass tube having an inside diameter of 20 mm and an outer diameter of 25 mm was set up on a glass lathe and, while rotating at 60 r.p.m., its outer wall was heated with reciprocating oxygen-hydrogen flame at a temperature in the range of from 1350° to 1450° C. In the first stage of the production, $SiCl_4$, $O_2$, $PF_3$ and $BF_3$ were supplied into the tube at rates of 100 cc/min., 2000 cc/min, 50 cc/min and 50 cc/min, respectively, to form a coating of $P_2O_5$—$B_2O_3$—F—$SiO_2$ glass about 1 mm thick on the inner wall of the tube. In the next stage, a sheathed nozzle was inserted into the tube and reciprocated along with the oxygen-hydrogen flame (30 mm/min) as $SiCl_4$ was supplied through an inner pipe at a rate of 50 cc/min (diluted with helium supplied at 200 cc/min), $ClN_3$ was supplied through an intermediate pipe at a rate of 300 cc/min (diluted with $N_2$ supplied at 300 cc/min) and $CO_2$ was supplied through an outer pipe at a rate of 200 cc/min (diluted with helium supplied at 300 cc/min). The three gases were kept separated from each other by helium gas supplied at 100 cc/min. When this procedure was repeated for about 5 hours, a coating of $SiO_xN_y$ having a thickness of about 0.8 mm was formed on the inner wall of the tube. The nozzle was then removed from the tube which was further heated to a temperature more than 1,900° C. to collapse the hollow part of the tube and then drawn to thereby make a preform having a diameter of 18.9 mm. The resulting preform was heated in a resistance furnace (up to 2,000° C.) where it was drawn into a fiber having a diameter of 150 μm. Application of a silicon resin coating gave a fiber having a cladding diameter of 80 μm and a core diameter of 60 μm. The differential refractive index between the core and cladding was 3.0%. The transmission characteristics of the fiber were such that it had a transmission loss of only less than 4 dB per kilometer at λ=0.85 μm and only 1 dB per kilometer at λ=1.3μ. The concentration of

radicals was less than 2 ppm.

Example 2

The glass-making gases indicated below were supplied through a silica nozzle comprising coaxial pipes as shown in FIG. 3(b) and having an outside diameter of 30 mm; $NCl_3$ was supplied through a pipe 31 at a rate of 1 l/min, helium was suplied through a pipe 34 at a rate of 1 l/min, $SiCl_4$ and helium were supplied through a pipe 32 at rates of 0.2 l/min and 1.9 l/min, respectively, helium was supplied through a pipe 35 at a rate of 1 l/min, and $CO_2$ was supplied through a pipe 33 at a rate of 5 l/min. A silicon nitride pipe around the nozzle was used as a passage through which $(CN)_2$ and $O_2$ were supplied at rates of 10 l/min and 20 l/min, respectively. A fire flame was used to heat gases coming out through the nozzle assembly. The temperature of the nozzle assembly was 1,800° C. when no gas was supplied through it. Under these conditions, a soot body of fine particles of $SiO_xN_y$ glass was formed, heated to 1,000° C. in vacuum, held in a nitrogen atmosphere at that temperature for 3 hours, and thereafter elevated to 1,450° C. to produce an N-doped glass composition having a refractive index of about 1.483. In the next place, the supply of $NCl_3$ was replaced by a gradual supply of hydrogen gas for producing and sintering fine glass particles. The amount of nitrogen dopant decreased until the final index of refraction of the glass was 1.460.

Example 3

To show the advantages of this invention, two experiments were conducted wherein glass preforms for optical transmission were produced according to the process of this invention. In one experiment, a silica nozzle comprising three coaxial pipes was used to supply ammonia, a mixture of silicon tetrachloride and helium, and oxygen. Ammonia was supplied through an inner pipe at a rate of 3 liters per minute, silicon tetrachloride and helium were supplied through an intermediate pipe at rates of 0.1 liter and 1.9 liters per minute, and oxygen was supplied through an outer pipe at a rate of 3.5 liters per minute. These gases were introduced into a hot gas of nitrogen from a high-frequency (3.5 MHz) plasma where they were reacted with each other to provide transparent nitrogen-doped silica glass. The glass had an index of refraction of 1.470 which was adequately higher than that of pure silica glass.

In the other experiment, a silica nozzle comprising five pipes was used to supply the below indicated gases. Ammonia was supplied through the innermost pipe at a rate of 3 liters per minute, helium was supplied through the pipe first from the innermost pipe at a rate of 1 liter per minute, monosilane and helium were supplied through the pipe second from the innermost pipe at rates of 0.1 liter and 1.9 liters per minute, helium was supplied through the pipe third from the innermost pipe at a rate of 1 liter per minute, and carbon dioxide supplied through the outermost pipe at a rate of 7 liters per minute. A mixture of helium and nitrogen was supplied at a rate of 20 liters per minute through the space between the nozzle and a silicon nitride pipe provided coaxially to surround the nozzle. A platinum wire was wound around the silicon nitride pipe to heat the nozzle assembly such that its temperature was 1,400° C. when no gas was supplied through it. The resulting soot of $SiO_xN_y$ glass was built up as a layer of transparent glass on the outside surface of a graphite tube having an outside diameter of 10 mm and a wall thickness of 0.5 mm. As the layer built up, the supply of ammonia was gradually replaced by helium. Then, the graphite rod was removed and burnt out and the inside surface of the tube was washed in hydrofluoric acid to give a cylindrical nitrogen-doped silica glass preform, which was set up on a glass lathe and exposed to a plasma flame to soften its outside wall and the hollow part of the tube was collapsed and the collapsed rod was drawn to give a rod-shaped optical fiber preform 10 mm in diameter. The core of the preform had a refractive index of 1.478, and the cladding had a refractive index of 1.459.

As is clear from the foregoing description, the process of this invention forms a molten film of $SiO_xN_y$ glass soot directly on a starting member and obviates the sintering step conventionally required to make transparent glass. This eliminates the possibility of the Si—N bond being displaced by the Si—O bond during the sintering step, and in consequence, the escape of once doped nitrogen is minimized and the refractive index of the N-doped silica glass can be held high.

The advantages of the process of this invention are summarized below:

(1) A glass product can be produced at low cost because it uses as a dopant inexpensive nitrogen-containing compounds, $NO_2$, $CO_2$ and $O_2$ rather than expensive B, P and Ge;

(2) Since the index of refraction can be varied greatly according to the content of nitrogen dopant, a preform capable of forming a fiber having a desired numerical aperture can be produced;

(3) The light transmittance of $SiO_xN_y$ is by no means lower than that of $SiO_2$. The $SiO_xN_y$ glass is low in transmission loss at long wavelengths, and is less susceptible to radiations than $SiO_2$ glass. These features all contribute to the production of a fiber of good characteristics;

(4) The $SiO_xN_y$ has physical properties and chemical durability so close to those of $SiO_2$ that it is easily drawn to a high-reliability fiber;

(5) The center of the resulting preform has high nitrogen content and is viscous. Unavoidably, the preform under spinning is subjected to temperatures high enough to provide a very strong fiber; and (6) When nitrogen is not supplied in the form of a hydrogen-containing compound such as $NH_3$ as a nitrogen supplying compound, the gases supplied and the heating source used are anhydrous and, therefore, the process enables to produce a low-loss fiber of minimum content of

radicals.

What is claimed is:

1. A process for producing a glass preform for optical transmission fibers comprised of a substantially fluorine-free nitrogen-doped silica glass core and a surrounding fluorine-doped or undoped silica glass cladding layer, which comprises forming the cladding layer of the preform by depositing said fluorine-doped or undoped silica glass on said core in the molten state or depositing said fluorine-doped or undoped silica glass on said core in finely divided form and then sintering the same to yield said cladding layer, and which comprises forming the core of the preform by supplying a gaseous silicon compound, ammonia or a gaseous nitrogen compound, and an oxygen-containing gas as starting gases into a high temperature zone to produce fine particles of $SiO_xN_y$ glass and depositing said fine particles in the form of a soot or a transparent glass on a starting member to produce nitrogen-doped silica glass.

2. A process for producing a glass preform for optical transmission fibers comprised of a substantially fluorine-free nitrogen-doped silica glass core and a surrounding fluorine-doped or undoped silica glass cladding layer, which comprises forming the cladding layer of the preform by depositing said fluorine-doped or undoped silica glass on said core in the molten state or depositing said fluorine-doped or undoped silica glass on said core in finely divided form and then sintering the same to yield said cladding layer, and which comprises forming the core of the preform by supplying a gaseous silicon compound, ammonia and an oxygen-containing gas as starting gases into a high temperature zone to form a coating of fine particles of $SiO_xN_y$ glass on a starting member, and sintering the $SiO_xN_y$ glass particles in a high temperature zone to produce nitrogen-doped silica glass.

3. The process according to claim 1, wherein a gaseous silicon compound, ammonia and an oxygen-containing gas are supplied into a high temperature zone where the three gases react with each other to form fine particles of SiOxNy glass, and a layer of the glass particles so formed is directly deposited on a starting member in a molten state to thereby form nitrogen-doped silica glass.

4. The process according to claim 1, wherein said gaseous silicon compound, said gaseous nitrogen compound and said oxygen-containing gas are supplied into a high-temperature reaction zone to form fine particles of anhydrous SiOxNy glass, a coating of said fine particles of glass being formed on a starting member to produce nitrogen-doped anhydrous silica glass.

5. The process according to claim 4, wherein said coating of fine particles of anhydrous glass is formed on the starting member in a molten state.

6. The process according to claim 4, wherein said coating of fine particles of anhydrous glass is formed on the starting member and then it is sintered in a high-temperature zone to make nitrogen-doped silica glass.

7. A process according to any of claim 1 to 6, wherein said ammonia or said gaseous silicon compound and said gaseous nitrogen compound are supplied, optionally, together with an inert gas through an inner pipe of a sheathed nozzle, and said oxygen-containing gas is supplied through an outer pipe of the nozzle, the individual gases supplied being heated in a hot furnace or by a plasma flame to produce fine particles of SiOxNy glass.

8. The process according to any of claim 1 to 6, wherein either said gaseous silicon compound or a gaseous nitrogen compound and, optionally, an inert gas are supplied through an inner pipe of a sheathed nozzle, the other compound and, optionally, an inert gas are supplied through an intermediate pipe of the nozzle, and said oxygen-containing gas is supplied through an outer pipe of the nozzle, the individual gases supplied being heated in a hot furnace or by a plasma flame to produce fine particles of SiOxNy glass.

9. The process according to any of claims 1 to 6, wherein the doping of nitrogen is performed by varying the ratio of said ammonia or said gaseous nitrogen compound to said oxygen-containing gas while supplying said gaseous silicon compound at a constant rate.

10. The process according to any of claims 1 to 6, wherein an inert gas selected from the group consisting of nitrogen, argon and helium is supplied through a passage disposed both between the gaseous nitrogen compound-supply pipe and the gaseous silicon compound-supply pipe and between the gaseous silicon compound-supply pipe and the oxygen-containing gas-supply pipe, to thereby prevent the formation of a reaction product at the exit of the burner as a result of the reaction between the individual gases supplied.

11. The process according to any of claims 1 to 4, wherein said gaseous silicon compound is $SiH_4$, $SiHCl_3$ or $SiCl_4$.

12. The process according to any of claims 1 to 4, wherein said gaseous nitrogen compound is at least one of $NCl_3$, $NOCl$, $NO_2Cl$ and $ClN_3$.

13. The process according to any of claims 1 to 4, wherein said oxygen-containing gas is at least one of $NO_x$, $CO_2$ and $O_2$.

14. The process of any of claims 1–4, wherein said gaseous silicon is $SiH_4$, $SiHCl_3$ or $SiCl_4$; said gaseous nitrogen compound is at least one of $NCl_3$, $NOCl$, $NO_2Cl$ and $ClN_3$; and said oxygen containing gas is at least one of $NO_x$, $CO_2$ and $O_2$.

15. The process of claim 2, wherein said sintering is effected by heating at about 1450° C. in either oxygen-free gas atmosphere or a vacuum.

* * * * *